(12) United States Patent
Chiu et al.

(10) Patent No.: US 8,570,758 B2
(45) Date of Patent: Oct. 29, 2013

(54) MOUNTING APPARATUS FOR EXPANSION CARD

(75) Inventors: Po-Wen Chiu, New Taipei (TW);
Wen-Hu Lu, Shenzhen (CN);
Zhan-Yang Li, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 166 days.

(21) Appl. No.: 13/217,029

(22) Filed: Aug. 24, 2011

(65) Prior Publication Data
US 2012/0161592 A1    Jun. 28, 2012

(30) Foreign Application Priority Data
Dec. 27, 2010    (CN) .......................... 2010 1 0606904

(51) Int. Cl.
*H05K 5/00*    (2006.01)

(52) U.S. Cl.
USPC ...... 361/752; 361/679.32; 361/741; 361/801; 361/802; 439/62; 439/327

(58) Field of Classification Search
USPC ............ 361/679.32, 741, 752, 801–803, 810; 439/59–62, 327, 328
See application file for complete search history.

(56) References Cited

U.S. PATENT DOCUMENTS

| | | | | |
|---|---|---|---|---|
| 7,012,813 B2 * | 3/2006 | Wang et al. | .................... | 361/801 |
| 7,120,032 B2 * | 10/2006 | Lin et al. | ........................ | 361/801 |
| 7,558,055 B2 * | 7/2009 | Chen et al. | ............... | 361/679.32 |
| 7,573,704 B2 * | 8/2009 | Chen et al. | ............... | 361/679.32 |
| 2007/0030660 A1 * | 2/2007 | Peng et al. | .................... | 361/801 |

* cited by examiner

*Primary Examiner* — Anatoly Vortman
*Assistant Examiner* — Jacob Crum
(74) *Attorney, Agent, or Firm* — Altis & Wispro Law Group, Inc.

(57) ABSTRACT

A mounting apparatus includes a chassis, a mounting member, a mounting tray received in the chassis, and a securing device. The chassis includes a front plate and a positioning member attached to the front plate. The mounting member is used to secure an expansion card and includes a flange. The mounting tray includes a front panel and a retaining panel connected to the front panel. The securing device includes a first securing member and a second securing member. The first securing member is rotatably attached to the front plate, and the second securing member is rotatably attached to the first securing member. The flange is located between the retaining panel and the first securing member. The positioning member abuts the second securing member, to prevent the second securing member from being disengaged from the first securing member.

16 Claims, 8 Drawing Sheets

MOUNTING APPARATUS FOR EXPANSION CARD

BACKGROUND

1. Technical Field

The present disclosure relates to mounting apparatus, and particularly to a mounting apparatus for securing expansion cards in an electronic device.

2. Description of Related Art

A computer system usually includes expansion cards, such as sound cards, video cards, graphics cards and etc., for enhancing the capabilities of the computer system. The expansion cards are often attached to the computer casing with screws. However, using screws to attach the expansion cards is laborious and time consuming.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
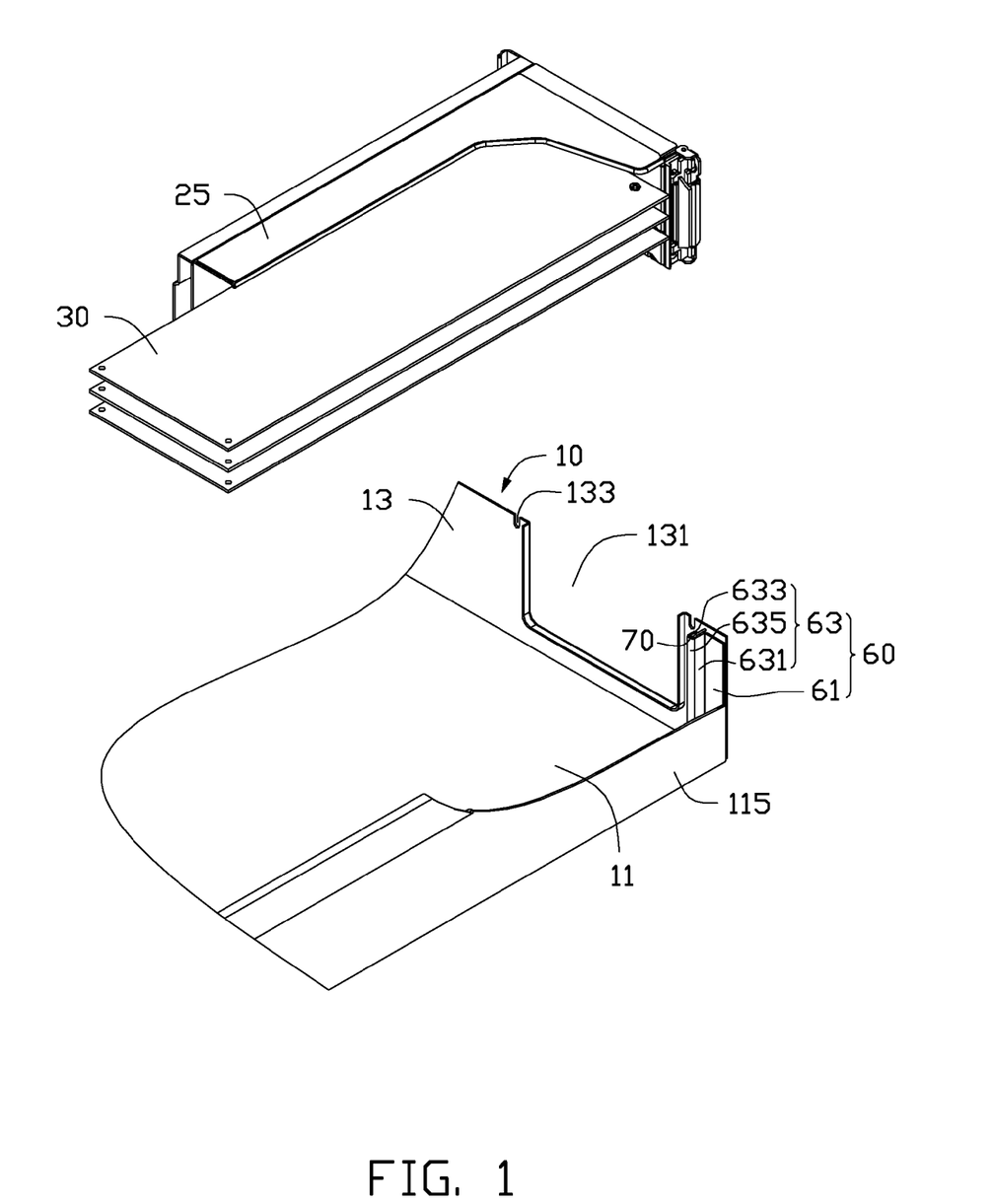
FIG. 1 is a partially exploded, isometric view of a mounting apparatus for an expansion card in accordance with an embodiment.
Figure 2:
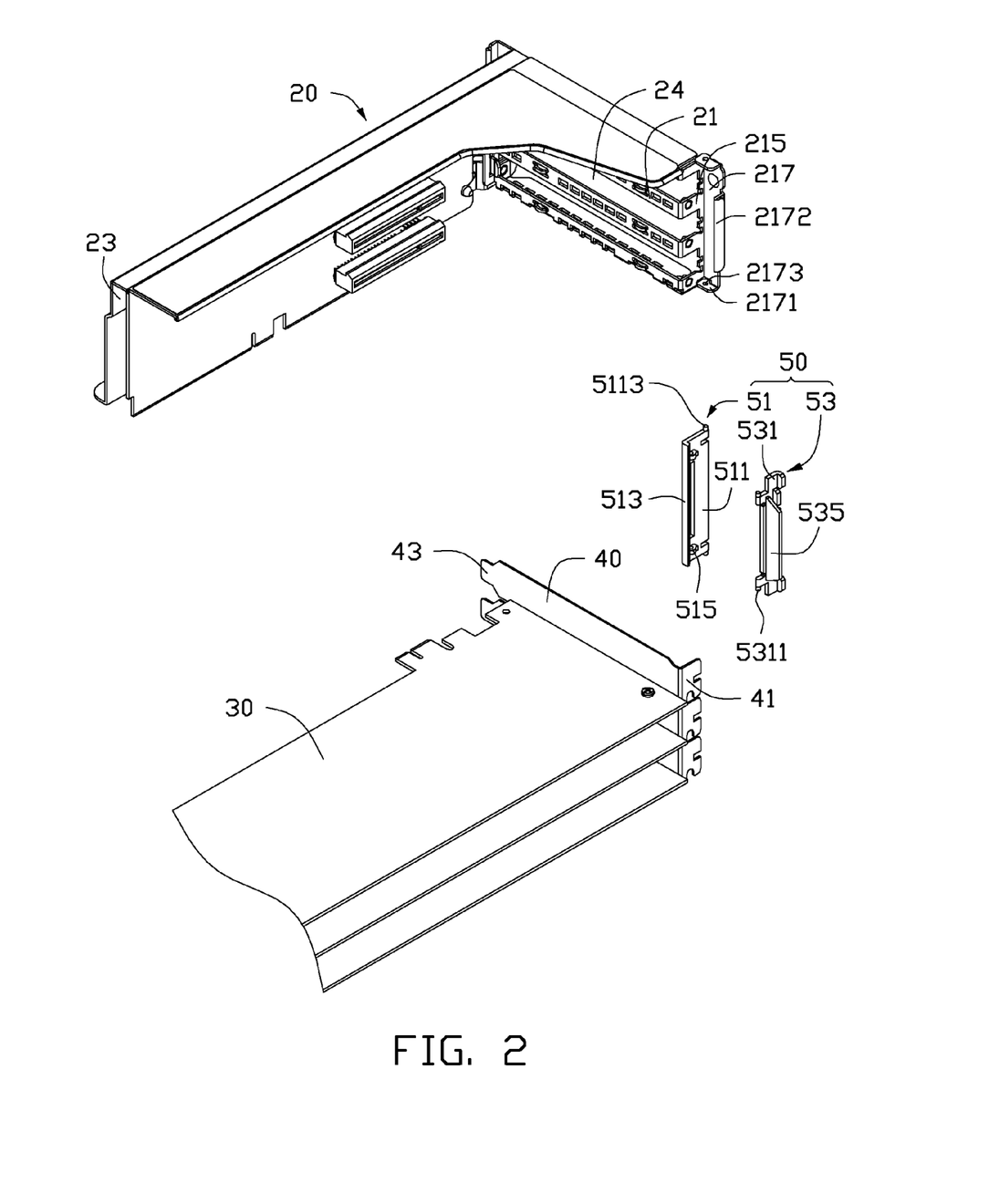
FIG. 2 is similar to FIG. 1, but without a chassis.

Referring to FIGS. 1 and 2, a mounting apparatus capable of securing three expansion cards 30, includes a chassis 10, a mounting tray 20, and a securing device 50. The three expansion cards 30 may be, for example, one or more sound cards, video cards, or graphics cards, or other peripheral component interconnection (PCI) cards.

A mounting member 40 is attached to a front portion of each expansion card 30. A flange 41 is located at a first end of the mounting member 40, and an insertion portion 43 extends from a second end of the mounting member 40.

The chassis 10 includes a bottom plate 11 and a front plate 13 connected to the bottom plate 11. In one embodiment, the bottom plate 11 is substantially perpendicular to the front plate 13. An opening 131 and two notches 133 are defined in the front plate 13. The two notches 133 are arranged in or on opposite sides of the opening 131.

Figure 6:
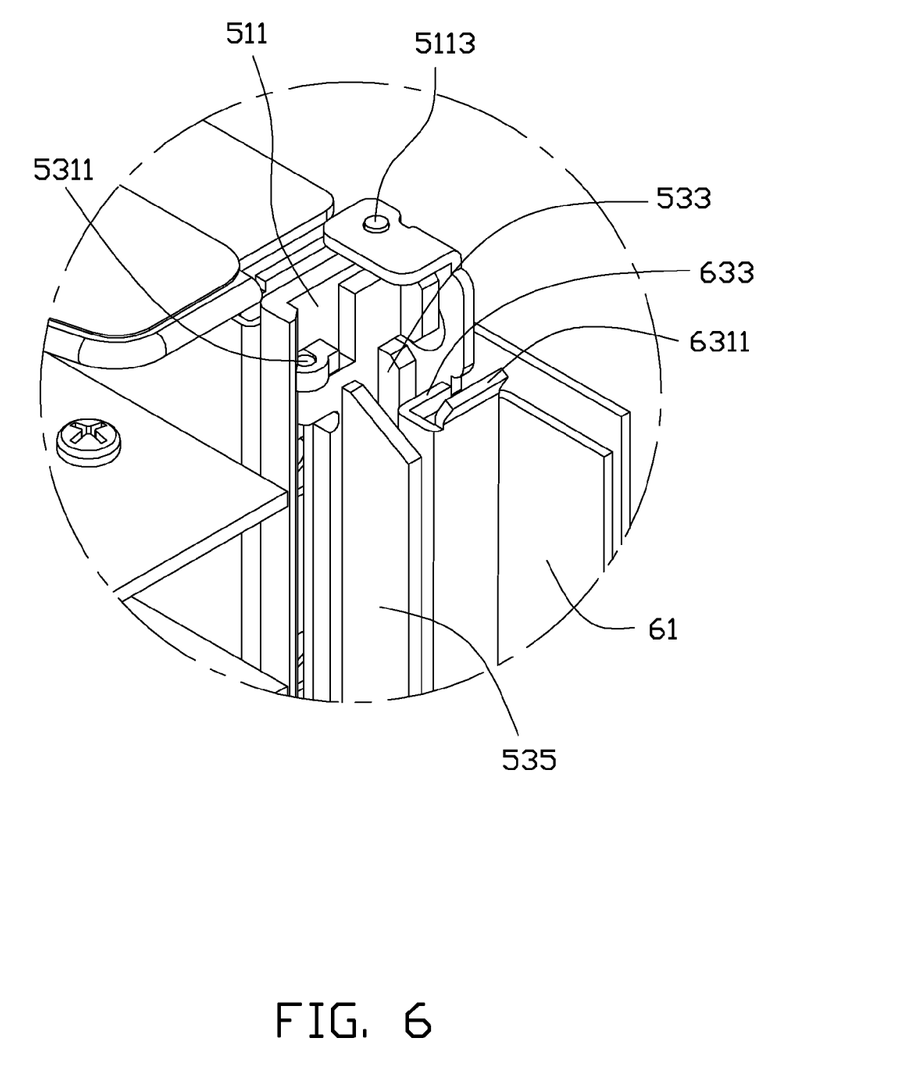
FIG. 6 is an enlarge view of a circled portion VI of FIG. 5.
Figure 7:
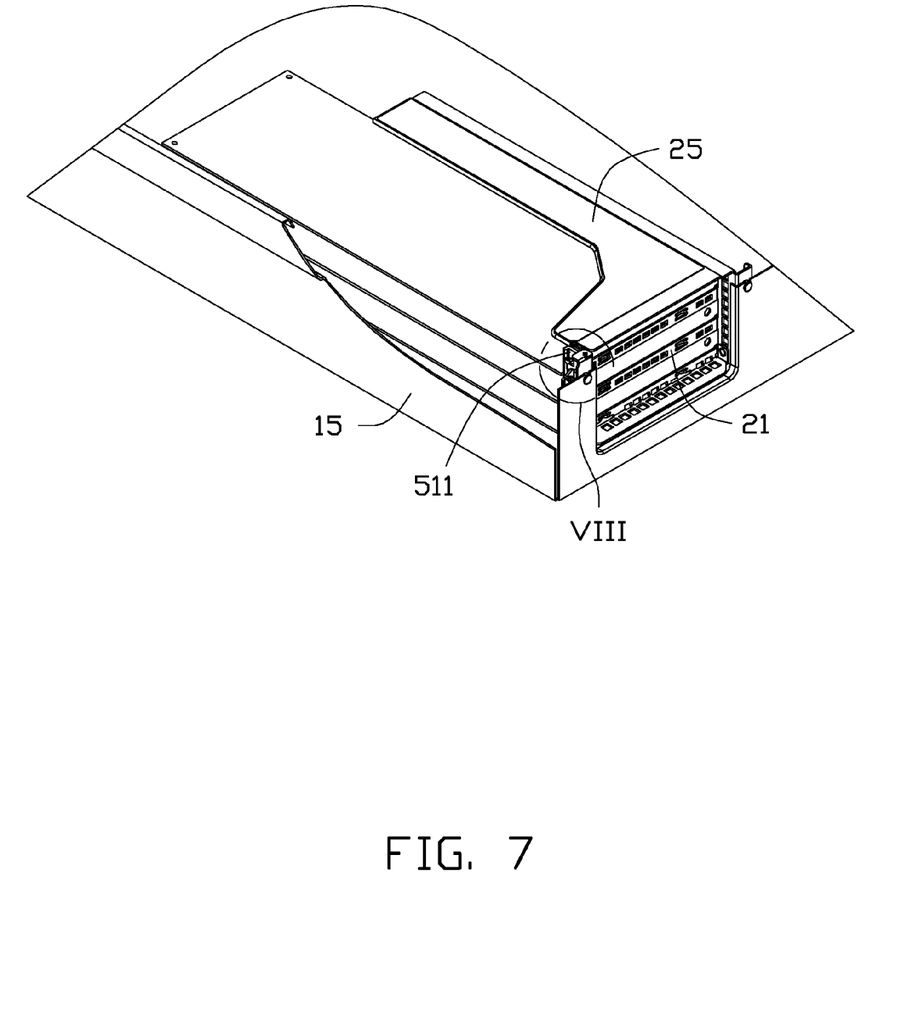
FIG. 7 is similar to FIG. 5, but viewed from a different aspect.
Figure 8:
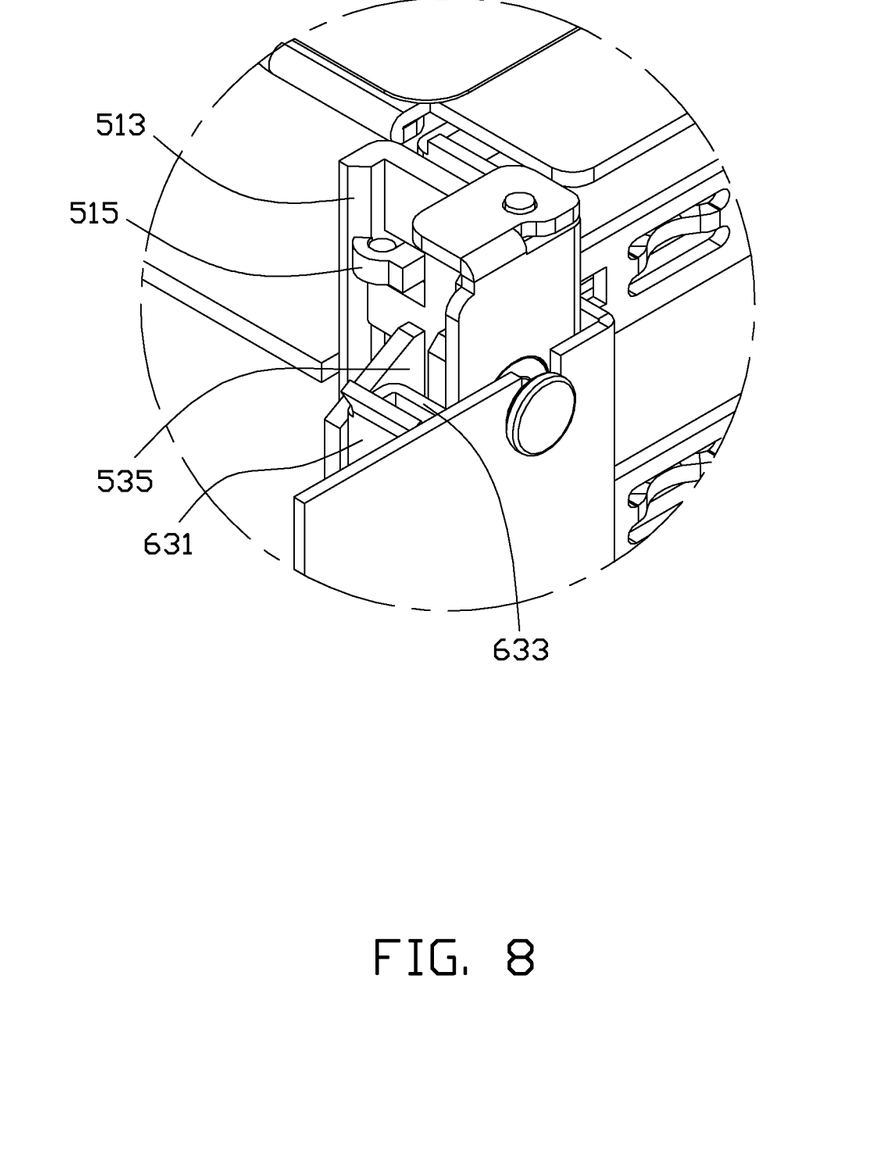
FIG. 8 is an enlarge view of a circled portion VII of FIG. 7.

A positioning member 60 is attached to an inner surface of the front plate 13. The positioning member 60 includes a securing piece 61 attached to the front plate 13 and a positioning portion 63 connected to the securing piece 61. The positioning portion 63 includes a first positioning piece 631, a second positioning piece 633, and a third positioning piece 635, located between the first and second positioning pieces 631, 633. An operating tab 6311 (see FIG. 6) is connected to the first positioning piece 631 and angled toward the first positioning piece 631. In one embodiment, the first, second and third positioning pieces 631, 633, 635 cooperatively define a receiving space 70.

The mounting tray 20 includes a front panel 21, a side panel 23, and a top panel 25. The top panel 25 is connected to the front panel 21 and the side panel 23. In one embodiment, the top panel 25 is substantially perpendicular to the front panel 21 and the side panel 23. A retaining panel 215 is connected to the front panel 21. The retaining panel 215 and the front panel 21 cooperatively define three expansion slots 214. A mounting panel 217, with a first mounting post 2170, is connected to the retaining panel 215. Two first pivot portions 2171 extend from a top side and a bottom side of the mounting panel 217, respectively. Each pivot portion 2171 further defines a first pivot hole 2173 therein. An arm 2172 extends from a side edge of the mounting panel 217. A mounting panel 231, including a second mounting post 2311, extends from the side panel 23. Three receiving holes (not shown), adjacent to the positioning panel 231, are defined in the side panel 23, for receiving the insertion portions 43.

Figure 3:
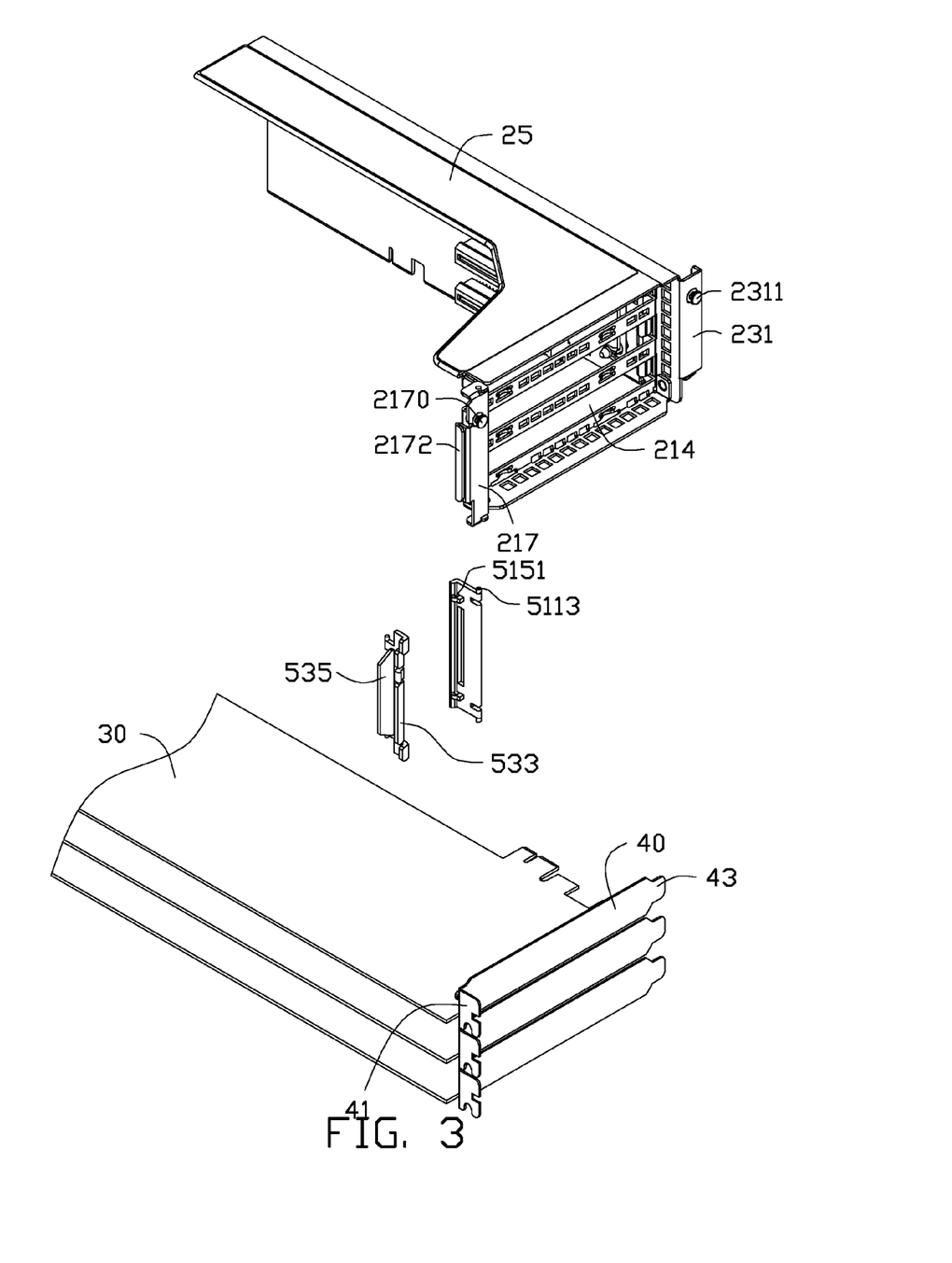
FIG. 3 is similar to FIG. 2, but viewed from a different aspect.
Figure 4:
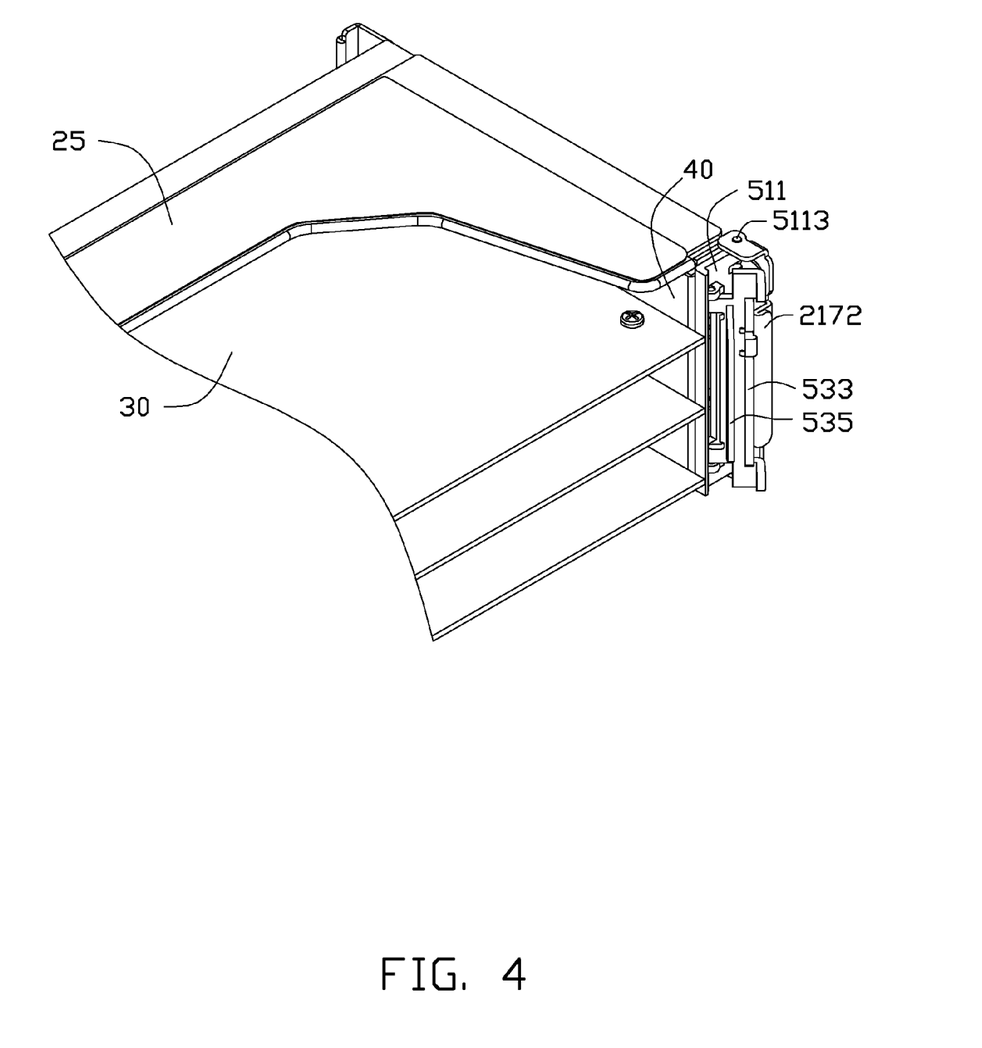
FIG. 4 is an assembled view of FIG. 2.
Figure 5:
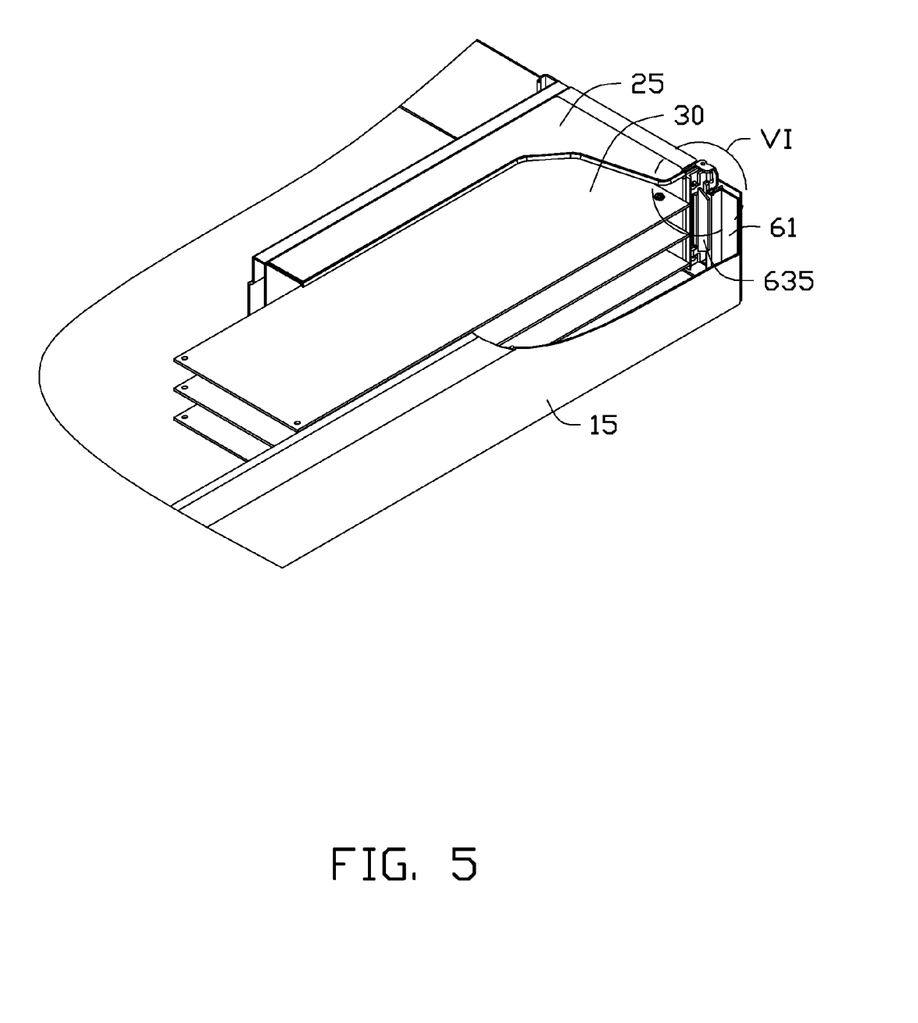
FIG. 5 is an assembled view of FIG. 1.

Referring to FIGS. 2-3, the securing device 50 includes a first securing member 51 and a second securing member 53 rotatably attached to the first securing member 51. The first securing member 51 includes a first base 511 and an extending portion 513, connected to the first base 511. Two first pivot posts 5113, corresponding to the two first pivot holes 2173, extend from opposite sides of the first base 51. Two second pivot portions 515 are located between the first base 511 and the extending portion 513. Each second pivot portion 515 further defines a second pivot hole 5151.

The second securing member 53 includes a second base 531, a resisting panel 533, and a driving panel 535. Two second pivot posts 5311 corresponding to the two second pivot holes 5151, are located on the second base 531. In one embodiment, the driving member 535 is substantially parallel to the resisting panel 533, and perpendicular to the second base 531.

Referring to FIGS. 4-8, in assembly, the first securing member 51 is located between the two first pivot portions 2171. The two first pivot posts 5113 are received in the two first pivot holes 2173, to rotatably secure the first securing member 51 to the mounting panel 217. The two second pivot posts are received in the two second pivot holes 5151, to rotatably secure the second securing member 53 to the first securing member 51.

The securing device 50 is rotatable relative to the mounting panel 217 between an open position and a close position. In the open position (see FIG. 4), the first base 511 is at an angle to the retaining panel 215 to define a gap, and the second base 531 is at an angle to the first base 511. In the close position (see FIG. 6), the first base 511 is substantially parallel to the retaining panel 215, and the second base 531 abuts against the first base 511.

In assembly of the expansion cards 30, the second securing member 53 is rotated clockwise around the second pivot posts 5311, and the first securing member 51 is rotated anticlockwise around the first pivot posts 5113, until the securing device 50 is rotated to the open position.

The three expansion cards 30 are received in the mounting tray 20, and the mounting members 40 are positioned in the expansion slots 214. The insertion portions 43 are inserted into the three receiving holes of the side panel 23. The flanges 41 are located between the retaining panel 215 and the first base 511. The second securing member 53 is rotated anticlockwise around the second pivot posts 5311, and the first securing member 51 is rotated clockwise around the first pivot posts 5113, until the securing device 50 is rotated to the close position.

The mounting tray 20 is accommodated in the opening 131. The first and second mounting posts 2170, 2311 are inserted into the two notches 133, and the arm 2172 is received in the receiving space 70. The second positioning piece 633 is located between the arm 2172 and the resisting panel 533 to prevent the second securing member 53 from rotating around the second pivot posts 5311. Therefore, the second securing member 53 can be stably secured to first securing member 51, and the flanges 41 can be sandwiched between the first base 511 and the retaining panel 215.

In disassembly, the mounting tray 20 is moved upward to disengage the arm 2172 from the receiving space 70. The second securing member 53 is rotated clockwise around the second pivot posts 5311, and the first securing member 51 is rotated anticlockwise around the first pivot posts 5113, until the securing device 50 is rotated to the open position. Therefore, the flanges 41 can be disengaged from the gap between the retaining panel 215 and the first base 511. The expansion cards 30 may be moved to disengage the insertion portions 43 from the receiving holes of the side panel 23, so that the expansion cards 30 may be detached from the mounting tray 20.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
a chassis comprising a bottom plate, a front plate connected to the bottom plate, and a positioning member attached to an inner surface of the front plate;
a mounting member, adapted to secure an expansion card, comprising a flange;
a mounting tray, attached to the bottom plate, comprising a front panel and a retaining panel connected to the front panel; and
a securing device comprising a first securing member and a second securing member, the first securing member rotatably attached to the front plate, and the second securing member rotatably attached to the first securing member; the first securing member is rotatable relative to the front plate in a first axis that is substantially perpendicular to the bottom plate; and the second securing member is rotatable relative to the first securing member in a second axis that is substantially parallel to the first axis;
wherein the securing device is rotatable relative to the front plate between a close position and an open position; in the close position, the first securing member abuts the flange, to position the flange between the first securing member and the retaining panel, the second securing member abuts the first securing member, and the positioning member abuts the second securing member, to prevent the second securing member from being disengaged from the first securing member; and in the open position, the second securing member is disengaged from the positioning member and the first securing member, and the first securing member is removed from the flange;
and the first securing member comprises a first base, and the first base is substantially parallel to the retaining panel when the securing device is located in the close position; a mounting panel, securing the first securing member, extends from the front plate; and when the securing device is rotated to the open position from the close position, a direction of the first securing member rotated relative to the mounting panel is opposite to that of the second securing member rotated relative to the first securing member; a first pivot post extends from the first base, and a first pivot portion is located on the mounting panel and engaged with the first pivot post; and an arm extends from the mounting panel, the second securing member comprises a resisting panel, and the positioning member is located between the resisting panel and the arm.

2. The mounting apparatus of claim 1, wherein an extending portion is connected to the first base, a second pivot portion is located between the extending portion and the first base, and a second pivot post is located on the second securing member and engaged with the second pivot portion.

3. The mounting apparatus of claim 1, wherein the second securing member comprises a second base, and the resisting panel is substantially perpendicular to the second base.

4. The mounting apparatus of claim 3, wherein a driving panel is connected to the second base, and the driving panel is substantially parallel to the resisting panel.

5. The mounting apparatus of claim 1, wherein a receiving space is defined in the positioning member, and the arm is received in the receiving space.

6. The mounting apparatus of claim 5, wherein the positioning member comprises a first positioning piece, a second positioning piece, and a third positioning piece located between the first positioning piece and the second positioning piece, the second positioning piece is located between the arm and resisting panel, and the first positioning piece, the second positioning piece and a third positioning piece cooperatively define the receiving space.

7. A mounting apparatus comprising:
a chassis comprising a front plate and a positioning member attached to an inner surface of the front plate;
a mounting member, adapted to secure an expansion card, comprising a flange;
a mounting tray, received in the chassis, comprising a front panel, a retaining panel connected to the front panel, and an arm substantially parallel to the retaining panel; and
a securing device comprising a first securing member and a second securing member, the first securing member is rotatably attached to the front plate, and the second securing member rotatably attached to the first securing member;
wherein the flange is located between the retaining panel and the first securing member; and the second securing member abuts the first securing member, to prevent the first securing member from being rotated along a first direction, and the positioning member is located between the second securing member and the arm, to prevent the second member from being rotated along a second direction opposite to the first direction.

8. The mounting apparatus of claim 7, wherein the first securing member comprises a first base, and the first base is substantially parallel to the retaining panel.

9. The mounting apparatus of claim 8, wherein a mounting panel is located between the retaining panel and the arm, a first pivot post extends from the first base, and a first pivot portion is located on the mounting panel and engaged with the first pivot post.

10. The mounting apparatus of claim 8, wherein an extending portion is connected to the first base, a second pivot portion is located between the extending portion and the first base, and a second pivot post is located on the second securing member and engaged with the second pivot portion.

11. The mounting apparatus of claim 10, wherein the second securing member comprises a resisting panel, and the second securing member abuts the positioning member via the resisting panel.

12. The mounting apparatus of claim 11, wherein the second securing member comprises a second base abutting the first base, and the resisting panel is substantially perpendicular to the second base.

13. The mounting apparatus of claim 12, wherein a driving panel is connected to the second base, and the driving panel is substantially parallel to the resisting panel.

14. The mounting apparatus of claim 11, wherein a receiving space is defined in the positioning member, and the arm is received in the receiving space.

15. The mounting apparatus of claim 14, wherein the positioning member comprises a first positioning piece, a second positioning piece, and a third positioning piece located between the first positioning piece and the second positioning piece; and the first positioning piece, the second positioning piece and a third positioning piece cooperatively define the receiving space.

16. The mounting apparatus of claim 15, wherein the second positioning piece is located between the arm and resisting panel.

\* \* \* \* \*